United States Patent
Tsukamoto et al.

[11] 3,872,087
[45] Mar. 18, 1975

[54] PROCESS FOR PRODUCTION OF 1,3-DISUBSTITUTED AZETIDINE DERIVATIVES

[75] Inventors: Kunio Tsukamoto, Tokyo; Yasushi Suzuki, Yokohama; Akihiro Izumi, Kawasaki; Yoshio Hiramatsu, Tokyo, all of Japan

[73] Assignee: Teikoku Hormone Mfg. Co., Ltd., Tokyo, Japan

[22] Filed: Oct. 17, 1972

[21] Appl. No.: 298,371

Related U.S. Application Data
[63] Continuation-in-part of Ser. No. 92,252, Nov. 23, 1970.

[30] Foreign Application Priority Data

| | | |
|---|---|---|
| Nov. 28, 1969 | Japan | 44-95027 |
| Mar. 31, 1970 | Japan | 45-26548 |
| Mar. 31, 1970 | Japan | 45-26549 |
| July 21, 1970 | Japan | 45-63377 |
| Oct. 16, 1970 | Japan | 45-90429 |
| Nov. 13, 1970 | Japan | 45-99733 |

[52] U.S. Cl. ............ 260/239 A, 424/244, 424/325, 424/330, 260/570.7
[51] Int. Cl. ............................. C07d 25/00
[58] Field of Search ................. 260/239 A

[56] References Cited
UNITED STATES PATENTS
3,600,380  8/1971  Gold .................. 260/239 A

FOREIGN PATENTS OR APPLICATIONS
1,169,027  10/1969  Great Britain ......... 260/239 A
1,932,219  3/1970  Germany ............... 260/239 A

OTHER PUBLICATIONS
Gaertner, "Tetrahedron Letters" No. 39, pages 4691–4694 (1966).
Gaertner, "J. Org. Chem." Vol. 35, No. 11, 1970 pages 3952–3958.
Gaj et al. "Tetrahedron Letters" No. 23, pages 2155–2157 (1967).

*Primary Examiner*—Henry R. Jiles
*Assistant Examiner*—Robert T. Bond
*Attorney, Agent, or Firm*—Sherman & Shalloway

[57] ABSTRACT

This invention relates to the production of a pharmaceutical intermediate which is a 1,3-disubstituted azetidine derivative expressed by the general formula

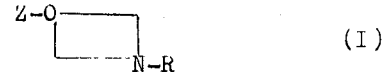

wherein Z represents a hydrogen atom or a group

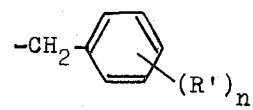

in which R' represents a hydrogen atom or an electron-donor group and n is a number of 1 to 3, and R represents an alkyl or aralkyl group.

19 Claims, No Drawings

PROCESS FOR PRODUCTION OF 1,3-DISUBSTITUTED AZETIDINE DERIVATIVES

This application is a continuation-in-part application of the Application Ser. No. 92,252 filed on Nov. 23, 1970.

This invention relates to the production of a novel 1,3-disubstituted azetidine derivative. More specifically, it relates to the production of a 1,3-disubstituted azetidine derivative expressed by the general formula

(I)

wherein Z represents a hydrogen atom or a group

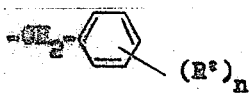

in which R' represents a hydrogen atom or an electron-donor group and n is a number of 1 to 3, and R represents an alkyl or aralkyl group.

A method comprising reacting an epihalohydrin with a primary amine has heretofore been known as the method of preparing azetidinol derivatives. In this method, where the alkyl group of the primary amine is of less steric hindrance, the yield is extremely poor, and even in the case of a tertiary butyl group of high steric hindrance, the yield is at most about 45 percent.

A method of preparing an azetidinol derivative by intramolecularly condensing a derivative of a 1-alkyl-3-halo-2-propanol whose hydroxyl group in the 3-position is protected with an acyl group has already been proposed. However, in accordance with this method, the intended azetidinol derivative is obtained in such a low yield as about 15 percent.

Recently, there has been proposed a method of preparing an azetidinol derivative by reacting a 1,3-dihalo-2-methoxymethoxypropane with a primary amine (*Tetrahedron Letter*, 2155–2157, 1967). In this method, when the steric hindrance of the alkyl group of the primary amine is high, the yield is extremely poor, and even when the alkyl group of the primary amine is a methyl group, the yield is only 40 – 50 percent.

There has not been any method that can give an azetidinol derivative in a high yield regardless of the steric hindrance of the alkyl group of the primary amine reactant.

We have now found that when the hydroxyl group in the 2-position of a 1,3-dihalo-2-propanol or 1-alkylamino-3-halo-2-propanol is protected with a benzyl group, a novel azetidine derivative of above general formula (I) can be obtained in a high yield by reacting such compound with an alkyl amine or aralkyl amine regardless of the steric hindrance of the alkyl or aralkyl group of the amine.

In accordance with this invention there is provided a process for the preparation of 1,3-disubstituted azetidine derivatives expressed by the following general formula

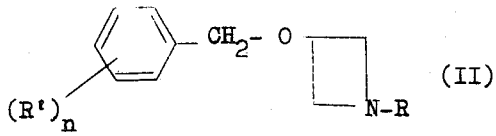
(II)

wherein
R' represents a hydrogen atom or an electron-donor group,
n is a number of 1 to 3, and
R stands for an alkyl or aralkyl group,
which comprises reacting a compound expressed by the general formula

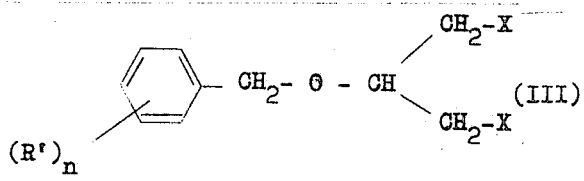
(III)

wherein
X represents a halogen atom or a reactive ester residue, and
R' and n are as defined above, with a compound expressed by the general formula $$H_2N-R$$

(IV)

wherein R is as defined above.

In the tertiary azetidine derivatives expressed by above formula (II), it is preferred that the group R is an alkyl group of up to 13 carbon atoms, especially up to six carbon atoms, or an aralkyl group of seven to nine carbon atoms.

Examples of the electron-donor group R' include an alkoxy group of up to four carbon atoms, such as methoxy, ethoxy, n-propoxy and isopropoxy groups; an alkyl group of up to four carbon atoms, such as methyl, ethyl, n-propyl and isopropyl groups; a halogen atom such as chlorine and bromine; and a halogenated alkyl group such as a fluoromethyl group. However, in this invention, the electron-donor group R' in above formula (II) is not limited to those recited above, and any ordinary electron-donor groups is included therein.

When the benzene nucleus is substituted by the electron-donor group R', it is preferred that the substituent is present in the para- or ortho-position to the alpha-carbon atom.

Examples of the tertiary azetidine derivatives this invention include 3-benzyloxy-1-methylazetidine, 3-(p-methoxybenzyloxy)-1-methylazetidine, 3-(p-ethoxybenzyloxy)-1-methylazetidine, 3-(p-methylbenzyloxy)-1-methylazetidine, 3-(p-ethylbenzyloxy)-1-methylazetidine, 3-(p-chlorobenzyloxy)-1-methylazetidine, 3-benzyloxy-1-ethylazetidine, 3-(p-methoxybenzyloxy)-1-ethylazetidine, 3-(p-ethoxybenzyloxy)-1-ethylazetidine, 3-(p-methylbenzyloxy)-1-ethylazetidine, 3-(p-ethylbenzyloxy)-1-ethylazetidine, 3-(p-chlorobenzyloxy)-1-ethylazetidine, 3-(o-methoxybenzyloxy)-1-ethylazetidine, 3-benzyloxy-1-propylazetidine, 3-benzyloxy-1-(iso-propyl)azetidine, 3-(p-methoxybenzyloxy)-1-(iso-propyl) azetidine, 3-(p-ethoxybenzyloxy)-1-(iso-propyl)azetidine, 3-(p-methylbenzyloxy)-1-(iso-propyl)azetidine, 3-(p-ethylbenzyloxy)-1-(iso-propyl)azetidine, 3-(p-chlorobenzyloxy)-1-(iso-propyl) azetidine, 3-benzyloxy-1-(tert.-butyl)azetidine, 3-(p-methoxybenzyloxy)-1-(tert.-butyl)azetidine, 3-(p-ethoxybenzyloxy)-1-(tert.-butyl)azetidine, 3-(p-methylbenzyloxy)-1-(tert.-butyl) azetidine, 3-(p- chlorobenzyloxy)-1-(tert.-butyl)azetidine, 3-benzyloxy-1-benzyl-azetidine, and 3-benzyloxy-1-phenetylazetidine.

The compounds of the above formula (III) to be used as starting compounds in this invention are compounds known per se, and include, for example, 1,3-dichloro-2-(benzyloxy) propane, 1,3-dibromo-2-(benzyloxy)-propane, 1,3-dichloro-2-(p-methoxybenzyloxy)propane, 1,3-dibromo-2-(p-methoxybenzyloxy) propane, 1,3-dichloro-2-(p-ethoxybenzyloxy)propane, 1,3-dibromo-2(p-ethoxybenzyloxy)propane, 1,3-dichloro-2-(o-methoxybenzyloxy)propane, 1,3-dibromo-2-(o-methoxybenzyloxy)propane, 1,3-dichloro-2-(ethoxybenzyloxy)propane, 1,3-dibromo-2-(o-ethoxybenzyloxy)propane, 1,3-dichloro-2-(p-methylbenzyl) propane. 1,3-dibromo-2-(p-methylbenzyloxy)propane, 1,3-dichloro-2-(p-ethylbenzyloxy)propane, 1,3-dibromo-2-(p-ethylbenzyloxy) propane, 1,3-dichloro-2-(p-iso-propylbenzyloxy)propane, 1,3-dichloro-2-(p-chlorobenzyloxy)propane and 1,3-dibromo-2-(p-chlorobenzyloxy)propane.

As the primary amine of general formula (IV) there may be used primary alkylamines and primary arylamines. It is preferred that in the formula (IV), the group R is a lower alkyl group such as methyl, ethyl, n-propyl, iso-propyl, n-butyl, iso-butyl, sec.-butyl and tert.-butyl, or an aralkyl group such as benzyl and phenethyl. Either primary amines of less steric hindrance such as methyl amine and ethylamine or primary amines of higher steric hindrance such as tert.-butylamine, isopropylamine, and benzylamine and phenethylamine may be similarly used in this invention, and from either of these amines azetidine derivatives of formula (II) can be obtained in good yields. This is one of the prominent advantages of this invention.

The reaction between the compound of formula (III) and the primary amine of formula (IV) may be conducted in the absence of a solvent, but in order to obtain azetidine derivatives of formula (II) in high yields, while preventing formation of diamines and polymers as by-products it is preferable to conduct the reaction in an inert liquid medium. Water is used most preferably as the inert liquid medium. The use of water as a reaction medium results in the formation of azetidine derivatives of formula (II) in very high yields. Instead of water, there may be used a mixed liquid of water and a water-miscible organic solvent such as an alcohol, e.g., methyl alcohol, ethyl alcohol and ethylene glycol, and tetrahydrofuran. Aromatic solvents such as benzene, toluene and aromatic alcohol solutions may be also used, but the time required for the reaction is very long.

Primary amines of formula (IV) may be added to the reaction system in the form of an aqueous solution, and the reaction may be advanced in the state where compounds of formula (III) are dispersed in such an aqueous solution. In general, it is preferable to use the primary amine of formula (IV) in an amount exceeding the stoichiometric amount, for instance, 2-to 5 moles per mole of the compound of formula (III). In such a case, unexpectedly, the formation of diamines as by-products is extremely reduced. The excess amine is recovered by a customary method. In case the primary amine of formula (IV) is used in an excess amount, it is unnecessary to particularly add an acid binder to the reaction system, but it is possible to add an acid binder such as a tertiary amine, pyridine and an inorganic alkali.

The reaction temperature is not critical, but in order to shorten the reaction time, it is preferable to conduct the reaction at a temperature from 60° to 100°C. At such a temperature, the reaction is usually completed in 10 to 50 hours.

In accordance with this invention, there is provided a process for the preparation of azetidinol derivatives of the following formula

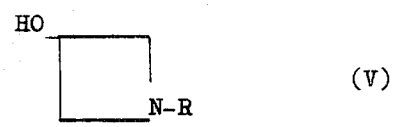

wherein R is an alkyl or aralkyl group, comprising reducing an azetidine derivative of the following formula, which is prepared by the above-mentioned reaction,

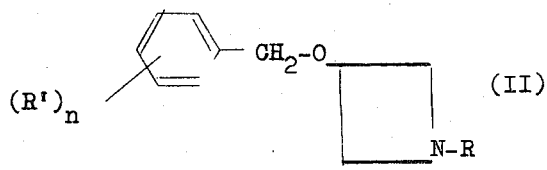

wherein R, R' and n are as defined above, with hydrogen.

The hydrogen reduction may be accomplished at a temperature ranging from room temperature to 100°C., preferably 40° to 50°C, under a hydrogen pressure of 1 to 100 atmospheres preferably 1 to 50 kg/cm², with a metallic catalyst such as Raney nickel, Raney cobalt, U-nickel, palladium and platinum.

The reduction may be accomplished in the absence of a solvent, but it is preferred that the reduction is carried out in a polar solvent such as aqueous or anhydrous alcohols, e.g., methanol and ethanol, and ethers, e.g., diethylether.

In compounds of formula (II), it is not always easy to selectively isolate the benzyl group alone because of the reactivity of the azetidine ring and the steric hindrance owing to the benzyl in the 3-position and alkyl groups in the 1-position of the azetidine ring. Accordingly, it is difficult to split off the benzyl group with a mineral acid. In case a palladium-carbon catalyst is used, the reaction conducted under room temperature and atmospheric conditions results substantially in mere recovery of the starting material. Accordingly, in the case of a palladium-carbon catalyst, considerably severe reaction conditions are required. The catalysts that can advance advantageously the hydrogen reduction under relatively mild conditions are Raney nickel and U-nickel.

For better illustration, the typical instances of the azetidinol derivative expressed by above general formula (V) are recited hereinbelow:

1. N-normal or secondary alkyl-azetidinol derivatives of the following formula

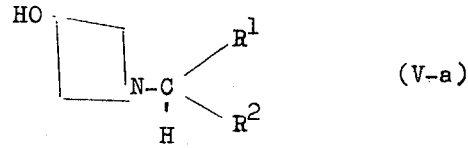

wherein R¹ and R², which may be the same or different, stand for an alkyl group coincidentally, or one of $R^1$ and $R^2$ is a hydrogen atom and the other is an alkyl group.

The following compounds, for instance, are included in this group:
* 1-methyl-3-azetidinol,
* 1-ethyl-3-azetidinol,
* 1-n-propyl-3-azetidinol,
* 1-isobutyl-3-azetidinol,
* 1-isoamyl-3-azetidinol,
* 1-isopropyl-3-azetidinol,
* 1-sec-butyl-3-azetidinol, and
* 1-sec-amyl-3-azetidinol.

2. N-tertiary alkyl-azetidinol derivatives of the following formula:

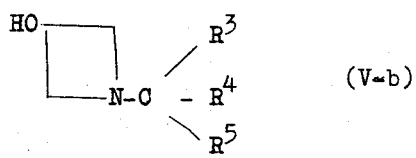

(V-b)

wherein $R^3$, $R^4$ and $R^5$, which may be the same or different, stand for an alkyl group.

The following compounds, for instance, are included in this group:
* 1-tert-butyl-3-azetidinol, and
* 1-tert-amyl-azetidinol.

3. N-aralkyl-azetidinol derivatives of the following formula:

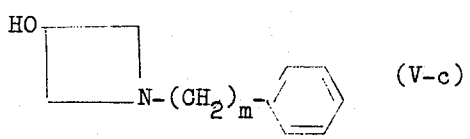

(V-c)

wherein $m$ is a number of 1 to 3.

The following compounds are included in this group:
* 1-benzyl-3-azetidinol, and
* 1-phenyl-3-azetidinol.

Azetidine derivatives of above general formula (I) obtained in accordance with this invention may be converted to various useful pharmaceutical compounds by utilizing the reactivity of the azetidine ring thereof. For instance, they are valuable intermediates for the synthesis of various pharmaceutically effective compounds having the alkanol amine structure, such as compounds of the following formula, which have beta-adrenergic blocking activity:

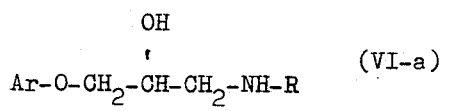

(VI-a)

and compounds of the following formula, which have activity controlling secretion of gastric juice:

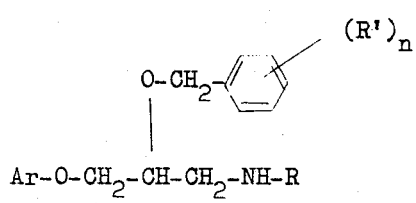

In above formulae (VI-a) and (VI-b), Ar stands for a substituted or unsubstituted aryl group, and R, R' and n are as defined above.

This invention will now be illustrated more specifically by reference to Examples.

EXAMPLE 1

21.9 parts of 2-benzyloxy-1,3-dichloro-propane and 77.5 parts of monomethylamine (40 percent aqueous solution) were taken in an autoclave and they were heated at 90°C. for 48 hours with agitation. The reaction mixture was cooled and 120 parts of 2N-NaOH aqueous solution was added thereto. Then the mixture was heated to distill off excessive monomethylamine. The remaining liquor was extracted twice with 200 parts of ether, and the extract was washed with 100 parts of water, extracted with 100 parts of 2N-HCl aqueous solution and further extracted with 50 parts of 2N-HCl aqueous solution. The water layers were combined together, washed with 50 parts of ether and made sufficiently alkaline with 2N-NaOH aqueous solution. The liquor was extracted twice with 100 parts of ether, and the ether extract was washed in 50 parts of water and dried over anhydrous sodium sulfate. The solvent was distilled off and the residue was subjected to distillation to obtain 8.3 parts of 3-benzyloxy-1-methylazetidine boiling at 80° – 82°C. The yield was 47 percent. The results of infrared spectrum analysis and nuclear magnetic resonance analysis of the product are as follows:

IR $(CCl_4)\nu cm^{-1}$:
2940, 2825, 1445, 1350, 1195, 1180, 1100, 695

NMR $(CCl_4)$ ppm: 22.28, 3H(s), $>NCH_3$;

2.72, 2H(t), $-\overset{|}{\underset{|}{C}}-H$ ;

3.46, 2H(t), $-\overset{|}{\underset{|}{C}}-H$ ;

3.99, 1H(m), $-\overset{|}{\underset{|}{C}}OH$ ;

4.30, 2H(s) $-\overset{|}{\underset{|}{C}}H_2-$ ;

7.18, 5H(s), phenyl-H

The starting compound, 2-benzyloxy-1,3-dichloropropane is described in Zh. Crg. Khim. 3(1), 74 – 78 (1967).

EXAMPLE 2

21.9 parts of 2-benzyloxy-1,3-dichloro-propane, 45.1 parts of monoethylamine and 45.1 parts of water were taken in an autoclave and the mixture was heated at 90°C. for 48 hours with agitation. The reaction mixture was cooled and treated in the same manner as in Example 1, followed by distillation under reduced pressure. Thus there was obtained 11.6 parts of 3-benzyloxy-1-ethylazetidine boiling at 73° – 74°C. under 2 mm Hg. The yield was 61 percent. The results of infra-red spectrum analysis and nuclear magnetic resonance analysis of the product are as follows:

IR (CCl₄)νcm⁻¹:
2950, 2850, 1450, 1390, 1360,
1210, 1195, 1130, 1020, 700

NMR (CCl₄) ppm : 0.88, 3H(t), -CH₃ ;

2.36, 2H(q), ＼NCH₂- ;

2.67, 2H(t), -C-H ;

3.44, 2H(t), -C-H ;

4.20, 1H(m), -OCH ;

4.31, 2H(s), -CH₂ ;

7.18, 5H(S), 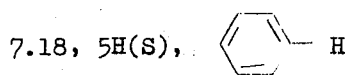 H

EXAMPLE 3

21.9 parts of 2-benzyloxy-1,3-dichloropropane, 59.1 parts of n-propylamine and 59.1 parts of water were taken in an autoclave, and the mixture was heated at 90°C. for 48 hours with agitation. The reaction mixture was cooled and treated in the same manner as in Example 1, followed by distillation under reduced pressure. Thus there was obtained 13.7 parts of 3-benzyloxy-1-(n-propyl) azetidine boiling at 101° – 103°C. under 2 mm Hg. The yield was 67 percent. The results of infrared spectrum analysis and nuclear magnetic resonance analysis of the product are as follows:
IR (CCl₄)νcm⁻¹:
2925, 1450, 1380, 1355, 1200,
1110, 1000, 695

NMR (CCl₄) ppm : 0.84, 3H(t), -CH₃;

1.20, 2H(m), -CH₂- ;

2.30, 3H(t), ＼NCH₂- ;

2.68, 2H(t), -CH ;

3.43, 2H(t), -CH ;

4.02, 1H(m), -OCH ;

4.31, 2H(S), -CH₂-

7.17, 5H(S), 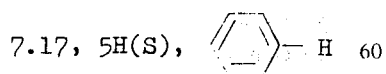- H

EXAMPLE 4

21.9 parts of 2-benzyloxy-1,3-dichloro-propane, 59.1 parts of iso-propylamine and 59.1 parts of water taken in an autoclave, and the mixture was heated at 90°C. for 48 hours with agitation. The reaction mixture was cooled and treated in the same manner as in Example 1, followed by distillation under reduced pressure. Thus there was obtained 17.4 parts of 3-benzyloxy-1-(iso-propyl)azetidine boiling at 105° – 107°C. under 2 mm Hg. The yield was 85 percent. The results of infrared spectrum analysis and nuclear magnetic resonance analysis of the product are as follows:
IR (CCl₄)νcm⁻¹:
2960, 2825, 1450, 1355, 1185,
1130, 1050, 1010, 700

NMR (CCl₄) ppm : 0.85, 6H(d), -CH₃ ;

2.20, 1H(m), ＼HCH ;

2.70, 2H(t), -CH ;

3.43, 2H(t), -CH ;

4.00, 1H(m), -OCH ;

4.32, 2H(S), -CH₂- ;

7.18, 5H(S), 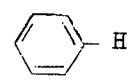- H

EXAMPLE 5

21.9 parts of 2-benzyloxy-1,3-dichloro-propane, 71.3 parts of tert.-butylamine and 50 parts of water were taken in an autoclave and the mixture was heated at 90°C. for 48 hours with agitation. The reaction mixture was cooled and treated in the same manner as in Example 1, followed by distillation under reduced pressure. Thus there was obtained 17.5 parts of 3-benzyloxy-1-(tert.-butyl) azetidine boiling at 94° – 96°C. under 2 mm Hg. The yield was 80 percent. The results of infrared spectrum analysis and nuclear magnetic resonance analysis are as follows:
IR (CCl₄)Γcm⁻¹:
2950, 1450, 1360, 1225, 1150,
1060, 690

NMR (CCl₄) ppm : 0.89, 9H(S), -CH₃ ;

2.95, 2H(t), -CH ;

3.33, 2H(t), -CH ;

4.00, 1H(m), -OCH ;

4.30, 2H(S), -CH₂- ;

7.17, 5H(S), 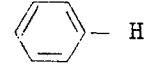- H

EXAMPLE 6

A solution of 4.1 parts of 3-benzyloxy-1-(iso-propyl)azetidine in 30 parts of ethanol was taken into an autoclave together with 2 parts of Raney nickel as catalyst, and under a hydrogen gas pressure of 100 atmospheres, the mixture was agitated at 40°C. for 15 hours to perform the reduction. The catalyst was removed by filtration and the remaining ethanol solution was concentrated to dryness. The resulting oily substance was subjected to distillation under reduced pressure, or dissolved in n-hexane and cooled. Thus there was obtained 1.9 parts of 1-(iso-propyl)-3-azetidinol in the form of white crystals. The product had a melting point of 56° – 57°C. and a boiling point of 75° – 76°C. under 3 mm Hg. The yield was 82 percent. The results of infra-red spectrum analysis and nuclear magnetic resonance analysis of the product are as follows:

IR (KBr)$\nu$cm$^{-1}$:
3100, 2960, 2825, 1465, 1410,
1340, 1210, 1160, 745

NMR (CCl$_4$) ppm : 0.90, 6H(d), -CH$_3$ ;

2.28, 1H(m), >NCH ;

3.73, 2H(t), -CH ;

3.46, 2H(t), -CH ;

4.20, 1H(m), -OCH ;

5.75, 1H(S), -OH

EXAMPLE 7

A solution of 4.4 parts of 3-benzyloxy-1-(tert.-butyl) azetidine in 30 parts of ethanol was taken into an autoclave together with 2 parts of Raney nickel as catalyst. Under a hydrogen gas pressure of 100 atmospheres, the mixture was stirred at 40°C. for 15 hours to perform the reduction. The catalyst was separated by filtration, and the remaining ethanol solution was concentrated to dryness. The resulting oily substance was dissolved in n-hexane and cooled. Thus there was obtained 2.0 parts of 1-(tert.-butyl)-3-azetidinol melting at 42° – 43°C. The yield was 76 percent. The results of infra-red spectrum analysis and nuclear magnetic resonance analysis of the product are as follows:

IR (KBr)$\nu$cm$^{-1}$:
3200, 2925, 1460, 1360, 1225,
1145, 1100, 980, 730

NMR (CCl$_4$) ppm : 0.97, 9H(S), -CH$_3$ ;

3.04, 2H(t), -CH ;

3.38, 2H(t), -CH ;

4.37, 1H(m), -OCH ;

6.30, 1H(S), -OH

EXAMPLE 8

33.7 parts of 2-(p-methoxybenzyloxy)-1,3-dibromopopane, 70 parts of monomethylamine and 70 parts of water were taken in an autoclave, and the mixture was heated at 90°C. for 48 hours with agitation. The reaction mixture was cooled and treated in the same manner as in Example 1, followed by distillation under reduced pressure. Thus there was obtained 11.7 parts of 3-(p-methoxybenzyloxy)-1-methylazetidine boiling at 85° – 87°C. under 2 mm Hg.

EXAMPLE 9

11 parts of 2-benzyloxy-1,3-dibromo-propane, 30 parts of iso-propylamine and 30 parts of water were taken in a stainless autoclave, and the mixture was heated at 80°C. for 2 hours with agitation. The reaction mixture was cooled and treated in the same manner as in Example 1, followed by distillation under reduced pressure. Thus there was obtained 18 parts of 3-benzyloxy-1-(iso-propyl) azetidine boiling at 104° – 107°C. under 2 mm Hg.

EXAMPLE 10

7 Parts of sodium hydroxide was dissolved in 40 parts of water, and 15.3 parts of 2-benzyloxy-1,3-dichloropropane and 10.5 parts of sec.-butylamine were added to the solution. The resulting mixture was heated at 80°C. under agitation for 48 hours in a pressure vessel. The reaction mixture was cooled and extracted with 100 parts of benzene. The basic portion was extracted from the benzene layer with use of 50 parts of 4N hydrochloric acid, and the aqueous layer was made basic with use of 4N sodium hydroxide to obtain an oily substance. The oily substance was extracted with 100 parts of ether, and the ether solution was dried on anhydrous sodium sulfate, following which the ether was removed by distillation, and the residue was subjected to distillation under reduced pressure to obtain 12.2 parts of 1-sec.-butyl-3-benzyloxy-azetidine boiling at 87° – 88°C. under 1 mm Hg. Results of the unclear magnetic resonance spectrum analysis and infrared absorption spectrum analysis of the product are as follows:

NMR$\delta^{CCl_4}_{ppm}$ :  0.60 – 1.55 7 H (m)
2.01 1H (m)
2.67 2H (t)
3.40 2H (t)
3.98 1H (q)
4.30 2H (s)
7.13 5H (s)
IR$\nu$CCl$_4$(cm$^{-1}$): 2925, 1445, 1350, 1185, 1125, 1030, 700

EXAMPLE 11

14 Parts of potassium hydroxide was dissolved in 50 parts of water, and to the solution were added 21.9 parts of 2-benzyloxy-1,3-dichloropropane and 14.6 parts of isobutylamine. The mixture was refluxed under agitation by heating it externally. After the reaction was thus conducted for 48 hours, according to customary techniques, the basic portion was extracted out and the solvent was distilled off after drying; following which the distillation was conducted. Thus, was obtained 14.1 parts of 1-isobutyl-azetidine boiling at 101° – 103°C. under 1 mm Hg. Results of the nuclear magnetic resonance spectrum analysis and infrared absorption spectrum analysis of the product are as follows:

NMR$\delta^{CCl_4}_{ppm}$ :
```
          0.83 6H (d)
          1.50 1H (m)
          2.15 2H (d)
          2.70 2H (t)
          3.45 2H (t)
          4.03 1H (q)
          4.31 2H (s)
          7.19 5H (s)
```
IR$\nu$CCl$_4$(cm$^{-1}$): 2900, 1450, 1360, 1185, 1175, 1050, 700

EXAMPLE 12

8 Parts of 1-sec-butyl-3-benzyloxy-azetidine was dissolved in 15 parts of methanol, and the mixture was heated at 30°C. under a hydrogen pressure of 40 atmospheres for 4 hours in the presence of 4 parts of Raney, nickel as a catalyst and 0.1 part of potassium hydroxide as an assistant to effect the reduction. The catalyst was separated by filtration, and the remaining solution was condensed and distilled to obtain 3.9 parts of 1-sec.-butyl-3-azetidinol boiling at 65° – 66°C. under 0.5 mm Hg. Results of the infrared absorption spectrum analysis and nuclear magnetic resonance spectrum analysis of the product are as follows:

IR$\nu$CCl$_4$(cm$^{-1}$):
```
          3300, 3080, 2900, 2800, 1430,
          1350, 1180, 1125, 1050, 980
```
NMR$\delta^{CCl_4}_{ppm}$ :
```
          0.6 – 1.7 8H (m)
          2.05 1H (m)
          2.73 2H (t)
          3.47 2H (t)
          4.20 1H (q)
          5.77 1H broad
```

EXAMPLE 13

22 Parts of 1-isobutyl-3-benzyloxyazetidine was dissolved in 20 parts of methanol, and the mixture was reduced at room temperature under a hydrogen pressure of 50 atmospheres for 10 hours with use of 5 parts of Raney nickel as a catalyst and 0.1 part of sodium hydroxide as an assistant. The catalyst was separated by filtration, and the remaining solution was condensed and distilled to obtain 7.2 parts of 1-isobutyl-3-azetidinol boiling at 45° – 46°C. under 0.5 mm Hg. Results of the infrared absorption spectrum analysis and nuclear magnetic resonance spectrum analysis of the product are as follows:

IR$\nu$CCl$_4$(cm$^{-1}$):
```
          3300, 3100, 2900, 2800, 1460,
          1340, 1200, 1140, 1080, 1040, 980
```
NMR$\delta^{CCl_4}_{ppm}$ :
```
          0.85 6H (d)
          1.50 1H (m)
          2.22 2H (d)
          2.74 2H (t)
          3.50 2H (t)
          4.26 1H (q)
          5.31 1H broad
```

EXAMPLE 14

A mixture of 21.9 parts of 2-benzyloxy-1,3-dichloropropane, 24.2 parts of β-phenethylamine and 40 parts of 20 % NaOH aqueous solution was agitated for 48 hours in a water bath maintained at 70°C. The reaction mixture was cooled and extracted with benzene. The resulting benzene layer was extracted with 4N HCl, and the hydrochloric acid aqueous solution was made alkaline with sodium hydroxide, following which the solution was extracted with ether. The ether layer was treated according to a customary manner and the ether was distilled off. Then, the residue was subjected to distillation under reduced pressure to obtain 6.2 parts (23 percent of the theoretical value) of 1-phenetyl-3-benzyloxy-azetidine boiling at 157° – 158°C. under 1 mm Hg. Results of the nuclear magnetic resonance spectrum analysis of the product are as follows:

NMR$\delta^{CCl_4}_{ppm}$
```
          2.56 4H (s)
          2.6 – 3.65 4H (m)
          3.8 – 4.2 1H (m)
          4.31 2H (s)
          7.07 5H (s)
          7.18 5H (s)
```

EXAMPLE 15

4.7 Parts of methyl azetidine was dissolved in 20 parts of methanol, and the solution was subjected to hydrogen reduction under a hydrogen pressure of 1 atmosphere for 20 hours in the presence of 1 part of Raney nickel. The catalyst was separated by filtration, and the methanol solution was condensed. The resulting oily substance was obtain 1.7 parts of 1-methyl-azetidinol boiling at 91° – 92°C. under 16.5 mm Hg.

EXAMPLE 16

4.5 Parts of 3-benzyloxy-1-ethyl-azetidine was dissolved in 20 parts of methanol, and 1.5 parts of Raney nickel and 1/50 mole equivalent of sodium hydroxide were added to the solution. The mixture was agitated in an autoclave at 40°C. under a hydrogen pressure of 50 Kg/cm$^2$ for 4 hours to effect the reduction. The catalyst was separated by filtration, and the remaining methanol solution was condensed. The resulting oily substance was subjected to distillation under reduced pressure to obtain 2.1 parts of 1-ethyl-3-azetidinol boiling at 82° – 83°C. under 17 mm Hg. Results of the nuclear magnetic resonance spectrum analysis of the product are as follows:

NMR$\delta^{CCl_4}_{ppm}$ :
```
          0.93 3H (t)
          2.43 2H (q)
          2.73 2H (t)
          3.48 2H (t)
          4.22 1H (q)
          5.79 1H (s)
```

EXAMPLE 17

4 Parts of 3-benzyloxy-1-(n-propyl)-azetidine was dissolved in 30 parts of methanol, and 2 parts of Raney nickel and 1/10 mole equivalent of potassium hydroxide were added to the solution. In an autoclave the mixture was reduced at 40°C. under a hydrogen pressure of 40 Kg/cm$^2$ for 3 hours. The reaction mixture was cooled and the catalyst was separated by filtration. The remaining methanol solution was condensed, and the resulting oily substance was subjected to distillation under reduced pressure to obtain 1.5 parts of 1-(n-propyl)-3-azetidinol boiling at 60° – 61°C. under 0.5 mm Hg.

EXAMPLE 18

5 Parts of 3-(p-methoxybenzyloxy)-1-methyl-azetidine was dissolved in 30 parts of methanol, and 1 part of 10 % - Pd on carbon and 1/100 mole equivalent of sodium hydroxide were added to the solution. The mixture was subjected to hydrogen reduction under a hydrogen pressure of 1 atmosphere for 48 hours. The catalyst was separated by filtration, and the remaining methanol solution was condensed. The resulting oily substance was subjected to distillation under reduced pressure to obtain 0.9 parts of 1-methyl-3-azetidinol boiling at 90° - 92°C. under 16.5 mm Hg.

EXAMPLE 19

4 Parts of 3-benzyloxy-1-β-phenetyl-azetidine was dissolved in 25 parts of methanol, and 2 parts of Raney nickel and 1/50 mole equivalent of sodium hydroxide were added to the solution. In an autoclave, the mixture was agitated at 50°C. under a hydrogen pressure of 50 Kg/cm$^2$ for 10 hours to effect the reduction. The catalyst was separated by filtration, and the remaining methanol solution was condensed. The resulting oily substance was subjected to distillation under reduced pressure to obtain 1.4 parts of 1-β-phenetyl-3-azetidinol boiling at 101° - 104°C. under 0.5 mm Hg.

REFERENTIAL EXAMPLE 1

To a mixture of 6.5 parts of 1-(tert.-butyl)-3-azetidinol and 6.7 parts of 2,3-xylenol was added 0.2 part of potassium hydroxide, and the mixture was heated at 155°C. for 20 hours. The reaction mixture was cooled and then dissolved in 100 parts of ether. The solution was washed three times with 50 parts of 2N-sodium hydroxide aqueous solution and extracted three times with 2N-hydrochloric acid aqueous solution. The extract was washed with 50 parts of ether and was made alkaline by adding 2N-sodium hydroxide solution thereto gradually. Then, the ether extraction was conducted three times and the extract was condensed and allowed to stand in a cool place. Thus there were formed crystals, which were recrystallized twice from ether to obtain 8.3 parts of 1-(2',3'-dimethylphenyloxy)-3-(tert.-butylamino-2-propanol having a melting point of 57°C. Results of infra-red spectrum analysis and ultraviolet ray absorption analysis of the product are as follows:

| | |
|---|---|
| IR$\nu_{max}^{Kbr}$(cm$^{-1}$): | 3400, 3250, 2960, 2910, 1455, 1100, 770 |
| UV$\lambda_{max}^{EtOH}$(mµε): | 271.2(1.08×10$^3$) 274(1.07×10$^3$) 279.3(1.11×10$^3$) |

REFERENTIAL EXAMPLE 2

To a mixture of 6.2 parts of 1-(iso-propyl)-3-benzyloxyazetidine and 43 parts of alpha-naphthol was added 1.5 parts of sodium hydroxide, and the mixture was heated at 200°C. for 16 hours. The reaction mixture was cooled, and 100 parts of ether was added thereto. Excessive alpha-naphthol was removed by extraction with 2N-sodium hydroxide aqueous solution. The remaining ether layer was washed in water and cried over anhydrous sodium sulfate. After distillation of ether, the residue was subjected to distillation to obtain 8.3 parts of 1-(alpha-naphthoxy)-2-benzyloxy-3-(iso-propylamino)-propane boiling at 192° - 195°C. The yield was 79 percent.

REFERENTIAL EXAMPLE 3

13.8 Parts of o-xylohydroquinone and 6.5 parts of 1-(tert.-butyl)-azetidinol were added to 50 parts of benzyl alcohol, and the mixture was heated at 150°C. under agitation for 6 hours in a nitrogen current. The reaction mixture was cooled, and 20 parts of 4N hydrochloric acid aqueous solution and 50 parts of ether were added to the reaction mixture. While the mixture was being agitated, crystals were precipitated. The so formed crystals were recovered by filtration, washed with ether and recrystallized from isopropyl alcohol to obtain 8.2 parts of 1-(tert.-butylamine)-3-(4-hydroxy-2,3-xylyloxy)-2-propanol hydrochloride having a melting point of 180° - 182°C. Results of the infrared absorption spectrum analysis, nuclear magnetic resonance spectrum analysis and mass spectrum analysis of the product are as follows:

| | |
|---|---|
| IR$\nu$KBR (cm$^{-1}$): | 3260, 2970, 2780, 1605, 1495, 1455, 1385, 1340, 1275, 1200, 1115, 805, 765 |
| NMR$_{ppm}^{(CD_3)_2SO}$: | 1.31 9H (s) |
| | 2.04 3H (s) |
| | 2.08 3H (s) |
| | 2.10 1H broad (extinguished with D$_2$O) |
| | 3.05 2H (m) |
| | 3.85 2H (d) |
| | 4.16 1H (m) |
| | 5.80 1H broad (extinguished with D$_2$O) |
| | 6.61 2H (s) |
| | 8.75 1H broad (extinguished with D$_2$O) |
| | 8.79 1H (s) (extinguished with D$_2$O) |
| Mass m/e: | M$^+$ 267 |

REFERENTIAL EXAMPLE 4

15.2 Parts of o-xylohydroquinone and 11.5 parts of 1-isopropyl-3-azetidinol were added to 50 parts of decalin, and the mixture was heated at 180°C. under agitation for 5.5 hours. To the reaction mixture was added 40 parts of 4N hydrochloric acid aqueous solution, and the mixture was allowed to stand still. Precipitated crystals were recovered by filtration, washed with acetone and recrystallized from ethanol to obtain 11.0 parts of 1-isopropylamino-3-(4-hydroxy-2,3-xylyloxy)-2-propanol hydrochloride having a melting point of 225° - 228°C. Results of the infrared absorption spectrum analysis, nuclear magnetic resonance spectrum analysis and mass spectrum analysis of the product are as follows:

| | | |
|---|---|---|
| IR$\nu$KBr (cm$^{-1}$): | 3260, 2980, 1595, 1500, 1455, 1275, 1120, 1070, 1010, 905, 805, 765 | |
| NMR$\delta_{ppm}^{(CD_3)_2SO}$: | 1.25 6H (d) | |
| | 2.03 3H (s) | |
| | 2.07 3H (s) | |
| | 2.8 - 3.5 4H (m) | (1H extinguished with D$_2$O) |
| | 3.82 2H (d) | |
| | 4.20 1H (s) | |
| | 5.77 1H broad | (extinguished with D$_2$O) |
| | 6.58 2H (s) | |
| | 8.76 1H (s) | (extinguished with D$_2$O) |
| | 8.9 1H broad | (extinguished with D$_2$O) |
| Mass m/e: | M$^-$ 253 | |

What we claim is:

1. A compound of the formula

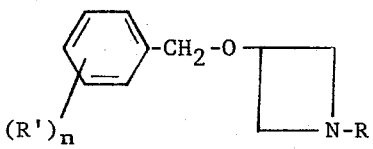

wherein R is an alkyl group of one to 13 carbon atoms or an aralkyl group of seven to nine carbon atoms,
R' is a hydrogen atom or an electron donor group selected from the group consisting of an alkyl group of one to four carbon atoms, an alkoxy group of one to four carbon atoms, a halogen atom and a halogenated alkyl group of one to four carbon atoms, and n is an integer of 1 to 3.

2. 3-Benzyloxy-1-tert.-butyl azetidine.
3. 3-Benzyloxy-1-iso-propyl azetidine.
4. 3-Benzyloxy-1-iso-butyl azetidine.
5. 3-Benzyloxy-1-sec-butyl azetidine.
6. 3-p-Methoxybenzyloxy-1-methyl azetidine.
7. 1-(n-Butyl)-3-azetidinol.
8. 1-(iso-Butyl)-3-azetidinol.
9. 1-(sec-Butyl)-3-azetidinol.
10. A process for preparing a compound of the formula

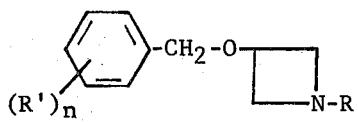

wherein
R is an alkyl group of one to 13 carbon atoms or an aralkyl group of seven to nine carbon atoms,
R' is a hydrogen atom or an electron donor group selected from the group consisting of an alkyl group of one to four carbon atoms, an alkoxy group of one to four carbon atoms, a halogen atom and a halogenated alkyl group of one to four carbon atoms, and
n is an integer of 1 to 3,
which comprises reacting a compound of the formula

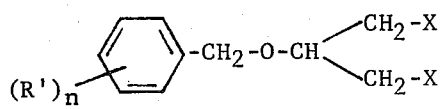

wherein
X is a halogen atom or a reactive ester residue, and R' and n are as defined above,
with a stoichiometrically excessive amount of a compound of the formula

H$_2$N—R wherein R is as defined above, in the presence of water.

11. The process of claim 10, wherein an inorganic alkali acid binder is added to the reaction system.
12. The process of claim 11, wherein the inorganic alkali acid binder is sodium hydroxide or potassium hydroxide.
13. The process of claim 10, wherein the reaction is carried out in a mixture of water and a water-miscible organic solvent.
14. The process of claim 13, wherein an inorganic alkali acid binder is added to the reaction system.
15. The process of claim 14, wherein the inorganic alkali acid binder is sodium hydroxide or potassium hydroxide.
16. The process of claim 10, wherein said reaction is carried out at a temperature ranging from 60° to 100°C.
17. A process for preparing a compound of the formula

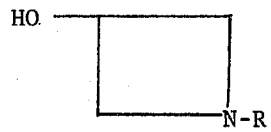

wherein R is an alkyl group of one to 13 carbon atoms or an aralkyl group of seven to nine carbon atoms, which comprises hydrogenating a compound of the formula

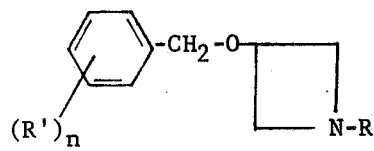

wherein
R' is a hydrogen atom or an electron donor group selected from the group consisting of an alkyl group of one to four carbon atoms, an alkoxy group of one to four carbon atoms, a halogen atom and a halogenated alkyl group of one to four carbon atoms, and
n is an integer of 1 to 3,
in the presence of Raney nickel or U-nickel.

18. The process of claim 17, wherein the hydrogenation is carried out at a temperature ranging from room temperature to 100°C and under a hydrogen pressure of 1 to 100 atmospheres.
19. The process of claim 17, wherein the hydrogenation is carried out in the presence of a polar solvent.

* * * * *